(12) United States Patent
Moliere et al.

(10) Patent No.: US 8,282,693 B2
(45) Date of Patent: Oct. 9, 2012

(54) METHOD OF OPERATING A THERMAL INSTALLATION AND USE OF SUCH A METHOD FOR INHIBITING VANADIUM CORROSION

(75) Inventors: Michel Moliere, Belfort (FR);
Emmanuel Rocca, Malleloy (FR);
Lionel Aranda, Nancy (FR); Aurelie Chiaravalle, Nancy (FR)

(73) Assignee: GE Energy Products France SNC, Belfort (FR)

( * ) Notice: Subject to any disclaimer, the term of this patent is extended or adjusted under 35 U.S.C. 154(b) by 388 days.

(21) Appl. No.: 12/561,554

(22) Filed: Sep. 17, 2009

(65) Prior Publication Data
US 2010/0255431 A1    Oct. 7, 2010

(30) Foreign Application Priority Data

Apr. 2, 2009  (EP) ..................................... 09305279

(51) Int. Cl.
*C10L 1/12*    (2006.01)
(52) U.S. Cl. ................ 44/314; 44/318; 44/321; 44/457; 44/620; 44/621; 44/622; 44/640; 44/641
(58) Field of Classification Search .................. 44/313, 44/318, 321, 457, 620, 621, 622, 640, 641, 44/314
See application file for complete search history.

(56) References Cited

U.S. PATENT DOCUMENTS

| 3,738,819 A | 6/1973 | Milner et al. |
| 3,994,699 A * | 11/1976 | Scott ............................. 44/320 |
| 4,047,875 A | 9/1977 | May et al. |

FOREIGN PATENT DOCUMENTS

| CH | 307980 | 6/1955 |
| EP | 09 305 279.3 | 9/2009 |
| GB | 764752 A | 1/1957 |
| WO | WO-99/51707 A1 | 10/1999 |

* cited by examiner

*Primary Examiner* — Cephia D Toomer
(74) *Attorney, Agent, or Firm* — Edwards Wildman Palmer LLP; Peter C. Lauro, Esq.

(57) ABSTRACT

The invention provides a method of operating a thermal installation comprising a combustion chamber fed with a fuel contaminated with vanadium, with sulphur and possibly with sodium. In particular, the combustion chamber is also fed with boron and with magnesium, in quantities such that the sodium molar ratio $s=Na_2SO_4/V_2O_5$, the magnesium molar ratio $m=MgO/V_2O_5$ and the boron molar ratio $b=B_2O_3/V_2O_5$ satisfy the equation $m \geq 3+2b-s$, so that the combustion products comprise magnesium orthovanadate, mixed magnesium boron oxide and possibly sodium borate. The invention also provides for the use of such a method to inhibit corrosion of the thermal installation by vanadium oxide, possibly in the presence of sodium.

20 Claims, 1 Drawing Sheet

METHOD OF OPERATING A THERMAL INSTALLATION AND USE OF SUCH A METHOD FOR INHIBITING VANADIUM CORROSION

RELATED APPLICATION

This application claims priority to European patent application Ser. No. EP 09 305 279.3, filed Apr. 2, 2009 pursuant to 35 U.S.C. §119(a). The entire content of the aforementioned European patent application is incorporated herein by reference.

The present invention relates to the protection of combustion installations burning vanadium-contaminated liquid fuels from vanadium corrosion. It relates in particular to a method of operating a thermal installation, for example a gas turbine, fed with this type of fuel.

From an economic standpoint, it is becoming increasingly advantageous to utilize in energy applications certain low-value petroleum fractions such as: very heavy crude oils, distillation residues (from atmospheric or vacuum distillation), by-products resulting from deep conversion of oils (high cycle oils and slurries deriving from FCC (fluid catalytic cracking) units) and possibly certain heavy distillates.

For this purpose, such fuels may be burnt in various combustion (or thermal) installations such as: gas turbines, boilers, furnaces, diesel engines, etc., for the purpose of producing heat, mechanical energy or electricity.

However, the presence in these oil fractions of organovanadium compounds mainly in the form of vanadium porphyrins generates corrosion problems in metal alloys and ceramics that are used as structural materials or as surface coatings (protective layers or thermal barriers) in parts of these installations exposed to the combustion gases at high temperature (for example above 650° C.), which parts will be denoted hereafter by "hot components".

In what follows, gas turbines (or GTs) will be taken as examples of combustion installations. The term "machine" will also be used. As per the usage, the firing temperature or $T_f$ of a GT refers not to the temperature within the flames but that of the combustion gases at their entry into the expansion turbine of the GT. This design parameter is important since the efficiency of a GT increases with its firing temperature. It should also to be recalled that, in modern GTs, the hottest components are, on the one hand, the components of the combustion system (combustion liners and transition pieces) and, on the other hand, the components of the turbine and mainly those of the first stage, namely the stationary blades (nozzles or partition vanes) and rotating blades. However, metallurgical limits dictate that these components be internally cooled so that their skin temperature (i.e. the temperature of their walls), namely $T_w$, is below that of the combustion gases.

This form of corrosion, called "vanadium corrosion", is due to the formation in the flames of vanadium compounds of oxidation state 5 that are distinguished by low melting points $T_m$ that lies below the firing temperature $T_f$, such as vanadium pentoxide ($V_2O_5$: $T_m$=675° C.) or compounds involving alkali metals, such as alkali metal metavanadates ($NaVO_3$: $T_m$=628° C.; $KVO_3$: $T_m$=517° C.; the eutectic of these two salts: $T_m$=475° C.) and $V_2O_5/Na_2SO_4$ mixtures (eutectic at 40 mol % $Na_2SO_4$: $T_m$=500° C.). Thus, it should be noted that the association of alkali metals (Na, K) with $V_2O_5$ is particularly deleterious because of the formation of compounds that are even more fusible and moreover more fluid and more conducting in the molten state.

These compounds are transported in liquid form by the combustion gases from the combustion chambers to the turbine and the fraction deposited on the hot components may result in vigorous electrochemical attack characteristic of the molten electrolytic media associated with oxidizing agents, in this case vanadium at the oxidation state 5 itself, sulphur at the oxidation state 6 ($SO_3$ and sulphates) coming from the fuel, and any residual oxygen contained in the combustion gases.

Vanadium corrosion may be inhibited by chemically trapping $V_2O_5$ within refractory and chemically stable compounds that eliminate the molten electrolytic medium and ipso facto this form of high-temperature corrosion. Possible vanadium inhibitors are compounds based on alkaline-earth metals, such as calcium salts and magnesium salts, or nickel compounds. These inhibitors, injected into the combustion chambers of the combustion installations to be protected, react with the vanadium compounds to form orthovanadates, the melting points of which are above 1000° C., which may be written in the form $M_3(VO_4)_2$ in which M denotes an alkaline-earth metal or nickel. In the particular case of magnesium, the magnesium orthovanadate (OV) having a melting point of 1074° C. is formed according to the following reaction:

$$V_2O_5+3MgO \rightarrow Mg_3(VO_4)_2. \quad (1)$$

In the presence of excess MgO, the chemical balance is expressed as:

$$V_2O_5+mMgO \rightarrow Mg_3(VO_4)_2+(m-3)MgO. \quad (1b)$$

This mode of inhibition, which consists in removing the corrosive vanadium derivatives from the exposed surfaces and in trapping them in reputedly stable refractory compounds, enables all materials, whether metallic, ceramic or composite, to be effectively protected. The inhibitor must be injected in sufficient quantity so as, on the one hand, to trap all the vanadium introduced by the fuel and, on the other hand, to form the orthovanadate and not a vanadate less rich in metal M, such as pyrovanadates $M_2V_2O_7$ (PVs) or metavanadates $M(VO_3)_2$ (MVs) that are insufficiently refractory. Magnesium metavanadate melts at 742° C. while the magnesium pyrovanadate phase, which melts at a temperature slightly below 1000° C. (980° C.), is non-corrosive at high temperature but is subject to the phenomenon of sintering, described below.

The molar ratios ($MO/V_2O_5$) corresponding to the orthovanadates, pyrovanadates and metavanadates are 3, 2 and 1 respectively. The minimum molar ratio ($MgO/V_2O_5$) for ensuring inhibition, which will also be denoted hereafter by the term "theoretical inhibition ratio", is therefore 3 in the case of inhibition by MgO.

All the inhibition methods have the common drawback of not reducing but on the contrary increasing the volume of ash that leaves the flame. The "magnesium-vanadium" ash formed during inhibition by MgO is deposited in the turbine, with the result that the GT is progressively fouled and its performance, i.e. its efficiency and the power that it produces, whether mechanical or electrical depending on the application, correspondingly degraded. The "ash deposition rate" may be defined as the ratio of the mass of ash deposited in the turbine to the mass entering thereinto over a given duration. This "ash deposition rate", from which the rate of fouling directly results, is a complex parameter accessible only by experimentation since, beside the temperature and the velocity of the gas stream and of the ash particles suspended therein, it depends on many other factors difficult to determine, such as: the chemical nature of the ash (composition of the fuel); the angle of impact of the particles relative to the substrate; the hardness of the particles compared with that of the impact surfaces (these impact surfaces are initially the bare metal walls, or the surface coating, then the layers that form progressively thereon), knowing that the physical properties of these layers are themselves liable to change as a result of a physical transformation (compaction or densification) or chemical transformation of the ash.

In particular, these deposited layers are the site of chemical equilibria, as explained later, and are also subjected to "sintering". The latter phenomenon, which is essential in the ageing process of any deposit, affects any crystalline solid heated to high temperature over long durations: the solid tends to densify by reduction in its porosity, to recrystallize and to harden. Consequently, irrespective of the method of inhibition, the long residence time of the ash on hot components is liable to result in the deposits being progressively sintered and becoming consequently more difficult to remove.

It should be noted that the ash particles deposited on the components of the 1st turbine stage and swept by the combustion gases are exposed to a temperature ($T_d$) comprised between the skin temperature ("$T_w$") and the firing temperature $T_f$, $T_d$ tending to increase when $T_f$ increases.

Furthermore, the sintering is accelerated in the presence of a molten phase, which accelerates internal atomic diffusion. Moreover, the sintering onset temperature of a phase is correlated with its melting point: the less refractory the phase, the more it tends to sinter, even if it is below its initial melting point or "solidus temperature". This results in the need of avoiding the presence of alkali metals, and especially sodium, in the ash since these metals form, as indicated above, combinations with $SO_3$ and $V_2O_5$ which, beside their corrosive character, have very low melting points. This is why a thorough "desalination" of the fuels is carried out upstream of the combustion installation.

To mitigate the losses in performance caused by excessively degraded operation of the machine, it is essential for these deposits to be periodically removed from the hot components. Two cleaning methods may be used for this purpose:

"dry cleaning", which consists in injecting projectiles into the turbine, these being formed from a slightly abrasive ash-free combustible material, typically formed from nut shell fragments of calibrated size. Its effectiveness therefore assumes that the deposited layer is quite friable, does not adhere to the walls of the hot components and can be disintegrated by such a mild abrasive. This method of restoring performance is carried out "on-line", i.e. with the installation in operation, but possibly with its load temporarily reduced. This method therefore has little impact on machine availability and on production;

"water washing", which consists in injecting hot water free of corrosive salts into the turbine, so as to dissolve and carry away the ash deposits. This assumes that the deposits have a soluble phase (such as magnesium sulphate) in an amount sufficient to destabilize, during its dissolution, the entire deposited layer, which will then be carried away by the stream of wash water. Since water washes must be carried out "off-line" (i.e. with the installation stopped) and requires the installation to be thoroughly cooled beforehand so as to avoid any thermal shock, production has to be shut down for several hours;

this method of restoring performance therefore has a major impact on machine availability and on production.

Inhibitors based on alkaline-earth metals (magnesium and calcium) are very effective in protecting against vanadium corrosion. However, the very low solubility in water of calcium sulphate ($CaSO_4$) and the hardness and strong adhesion of the deposits that it forms make the abovementioned cleaning methods inoperative. Calcium derivatives therefore cannot be used in practice as vanadium inhibitors.

Magnesium inhibitors, which are commercial additives very widely used, have three main drawbacks.

The first drawback is inherent in the limited chemical stability of the orthovanadate $Mg_3(VO_4)_2$ in a "sulphating atmosphere", i.e. one containing sulphur oxides. This is because, at the surface temperatures of the installation, this salt is partially decomposed by sulphur trioxide, with production of magnesium sulphate and magnesium pyrovanadate according to an equilibrated reaction (2):

$$Mg_3(VO_4)_2 + SO_3 \rightarrow Mg_2V_2O_7 + MgSO_4. \quad (2)$$

The formation of $MgSO_4$ is itself rather a positive effect, since the excellent solubility of this salt enables the ash deposits to be removed during the water washing step according to the mechanism described above. However, the pyrovanadate is insufficiently refractory and it is therefore necessary to add a certain excess of magnesium in order to shift, through the mass action effect, reaction (2) to the left, which means in fact using a molar dosage ratio m=($MgO/V_2O_5$) of around 12.6, which represents more than four times the stoichiometric ratio of reaction (1), which is 3. Taking into account the atomic masses of magnesium and vanadium (24.3 and 50.9 respectively), this molar ratio of 12.6 corresponds to an Mg/V mass ratio of about 3. This substantial overdosing increases the volume of ash generated, and therefore aggravates the fouling effect and furthermore increases the cost of the inhibition.

The second drawback stems from the fact that magnesium-based ash intrinsically results in a high "ash deposition rate" on the hot parts and therefore results in particularly rapid fouling of the gas turbine GT. This is a characteristic of $MgSO_4$—$Mg_3V_2O_8$ phases, which can be confirmed by simulation tests carried out in a burner rig but, as indicated above, cannot be deduced from a purely theoretical approach.

A third drawback is due to the limited thermal stability of $MgSO_4$, since at high temperature a sulphation/desulphation equilibrium according to equation (3) is established:

$$MgSO_4 \rightarrow MgO + SO_3. \quad (3)$$

With increasing temperature, this equilibrium is shifted in the endothermic direction, i.e. to the right, and $MgSO_4$ therefore tends to be desulphated. At the equilibrium, the rate of desulphation is higher the lower the $SO_3$ concentration (i.e. the lower the sulphur content of the fuel). The water-soluble magnesium sulphate is thus replaced with magnesium oxide, which is neither soluble in water nor in all of the reagents compatible with the integrity of superalloys. Moreover, since MgO has a higher density than $MgSO_4$ (3600 kg/m³ as opposed to 2600 kg/m³), as a result there is also a physical contraction and an agglomeration of the deposit: the latter loses its porosity and becomes more difficult to dissolve or to be mechanically disintegrated, while its tendency to be sintered is increased by this densification. By experiment, it has been shown that the desulphation reaction starts for a firing temperature of the order of about 1050° C. It is recalled that this temperature of 1050° C. is above the corresponding deposit temperature ($T_d$), which is consistent with the fact that the $MgSO_4$ desulphation temperature is rather of the order of 900° C., this level varying with the SO$_3$ content according to the equilibrated reaction (3). It should also be noted that the presence of incandescent soot particles in the fly ash tends to accelerate the desulphation phenomenon. This is because the carbon of the soot particles partially reduces MgSO$_4$ to MgS, which is subsequently oxidized to MgO and SO$_X$ by the oxygen of the combustion gases. Finally, once the deposit has been desulphated through its mass, its resulphation, which is thermodynamically possible should the temperature be lowered or the sulphur content of the fuel increased, is very slow because of the compacted structure of the MgO layers, which slows down the diffusion of SO$_3$ into the core of the deposit.

The drawbacks described above may be summarized as follows. Because of this MgSO$_4$ desulphation phenomenon, inhibition using magnesium appears in fact to be a relatively complex process, the actual balance of which is not simply that of reaction (1b) but involves the complete Mg$_3$V$_2$O$_8$—MgO—MgSO$_4$ system and is expressed overall (neglecting the formation of Mg$_2$V$_2$O$_7$) by means of the following equation:

(4)

in which:
m is the MgO/V$_2$O$_5$ molar ratio;
d is the rate of desulphation:
(moles of MgO)/(moles of MgO+MgSO$_4$); and
σ is the stoichiometric coefficient of the SO$_3$ reactant, equal to: (m−3)(1−d).

The "ideal" case corresponds to m=3 and d=0 (formation of Mg$_3$V$_2$O$_8$ alone and under stoichiometric conditions) and again gives equation (1). In practice, a high value of m is necessary in order to minimize the formation of Mg$_2$V$_2$O$_7$. This thus means 12.6 mol of MgO (instead of 3 in theory) per mole of V$_2$O$_5$. Such an increase in the value of m results, for a given firing temperature, in increasing MgO formation and therefore greater fouling. In addition, for increasing temperature, the amount of desulphation d increases, which also increases the formation of MgO.

The three effects described above, namely partial orthovanadate decomposition, magnesium sulphate desulphation and progressive ash sintering, will be described below generically by the expression "post-inhibition side reactions". Overall, these post-inhibition side reactions mean that, when the firing temperature exceeds a level of the order of 1090° C. (in order to be specific), the magnesium-based ash deposits can no longer be removed from the hot components, either by water washing or by dry cleaning. This 1090° C. temperature is therefore the maximum firing temperature compatible with "sustainable" operation of the machine, i.e. operation in which it is possible at any moment to re-establish the state of cleanliness and thereby the performance of the machine without having to intervene manually. This 1090° C. temperature level therefore sets the maximum efficiency of GTs burning vanadium-contaminated fuels using magnesium inhibition, whereas the modern GTs can operate at firing temperatures between 1140° C. (2nd-generation or E-class gas turbines) and 1430° C. (3rd-generation or F-class gas turbines) when the fuel is very pure.

In other words, the high-temperature instability of magnesium sulphate (MgSO$_4$), which is the only water-soluble phase of the ash, sets the limit of inhibition strategies that are based on the formation of partially water-soluble ash, in which strategies "water washing" constitutes the primary mode of deposit removal. Moreover, although calcium sulphate (CaSO$_4$) is much more thermally stable than MgSO$_4$ and undergoes no desulphation up to about 1400° C., the use of calcium as inhibitor is to be excluded for the above-mentioned reasons.

Another drawback of inhibition using MgO lies in the sensitivity of magnesium-vanadium ash to sodium: any traces of sodium contained in the fuel (residual sodium remaining after desalination) or in the air (Na$_2$SO$_4$ dust in an industrial environment or NaCl-rich fogs in a marine environment) are converted to Na$_2$SO$_4$ in the flames and are incorporated into the magnesium ash, either in the form of mixed sulphate Na$_6$Mg(SO$_4$)$_4$ which melts at 670° C. or, owing to the strong affinity existing between sodium and vanadium, in mixed vanadate form NaMg$_4$(VO$_4$)$_3$, which melts at 570° C. These two compounds not only make the ash more fusible and aggravate the sintering phenomenon, but are also potentially corrosive. In the past, certain additive suppliers have proposed to substantially increase the (Mg/V) dosing ratio up to 10 by weight (compared with 3, the usual value) in order to combat these two effects due to sodium; however, this correspondingly aggravates the fouling effect, and the preferred industrial solution consists in carrying out a thorough desalination of the fuel.

Nickel-based inhibitors are free of these post-inhibition side reactions. Since NiSO$_4$ is thermally unstable and decomposes above 600-700° C., the ash consists exclusively of nickel orthovanadate and, even though completely insoluble in water, this ash is not only refractory but also very friable and non-adherent. Such ash is therefore easily removed by dry cleaning, or even by water washing, enabling these solid particles to be carried away out of the turbine. The absence of post-inhibition side reactions, which dispenses with greatly overdosing the inhibitor, also leads to increased performance in terms of power and efficiency obtained with this inhibitor. However, the major drawback of nickel is an economic one, this metal being an expensive "strategic raw material", the market price of which can fluctuate widely over the months.

Consequently, any high-performance vanadium inhibition method must, in addition to providing effective protection of the hot components, meet other essential criteria associated with the optimization of the efficiency and of the "operation and maintenance" of the machines. There are four such criteria, namely:
 a moderate cost of the inhibitor;
 a high machine efficiency: the inhibition must be operative at high firing temperatures so as to fully benefit from the efficiency potential of modern GTs;
 "sustainable" performance: the fouling of hot components with ash must be as slow as possible and reversible, the latter term meaning that the state of cleanliness of the hot components must be able to be restored within the normal maintenance framework, it being recognized that the concept of "fouling reversibility" goes hand in hand with eliminating or at least reducing the "post-inhibition side reactions", as defined above; and
 good availability of the installation: the primary cleaning method used must limit any down-time of the machine, thereby encouraging the use of dry cleaning.

However, it should be noted that water washing, carried out at wider intervals, remains a useful secondary cleaning method. This is because, on the one hand, it produces a result similar to that of dry cleaning, through the effect of ash particles being mechanically entrained by the aqueous stream, and, on the other hand, it enables the abovementioned sodium-rich phases, which tend to accumulate and modify the ash deleteriously, to be periodically removed.

In view of the limitations of the current inhibition methods, it is therefore desirable to have a new inhibition method meeting the four criteria listed above. Thus, the object of the invention is to provide an inhibitor capable of: (i) effectively trapping the vanadium; (ii) depositing a minimum amount of ash, which can be easily removed, preferably by an on-line method (such as dry cleaning); and finally (iii) providing these two functions up to the highest possible limit temperature.

The Applicant has now discovered that it is possible and particularly advantageous to use certain mixed magnesium oxides for this purpose.

In what follows, the expression "mixed magnesium oxide" denotes a combination of MgO and a second oxide deriving from another element E and denoted by $E_yO_z$, where y and z are two positive integers. The mixed oxides in question have the generic formula: $xMgO$-$E_yO_z$ where x is an integer equal to 1, 2 or 3, depending on the nature of the second oxide.

Such oxides $E_yO_z$ are, on the one hand, capable of reacting with $MgSO_4$ at high temperature according to reaction (5), to form $SO_3$ and a mixed magnesium oxide:

$$xMgSO_4 + E_yO_z \rightarrow xMgO\text{-}E_yO_z + xSO_3. \quad (5)$$

On the other hand, the mixed magnesium oxide thus formed is capable of reacting with $V_2O_5$, to form, in a defined E/Mg/V composition range, the orthovanadate $Mg_3V_2O_8$ according to the reaction balance (6):

$$V_2O_5 + 3(xMgO\text{-}E_yO_z) \rightarrow Mg_3V_2O_8 + 3[(x-1)MgO\text{-}E_yO_z]. \quad (6)$$

Reaction (6) represents the $V_2O_5$ stoichiometric inhibition reaction which, unlike reaction (4) relating to the MgO-alone inhibitor, no longer involves $SO_3$.

In the presence of excess mixed oxide relative to stoichiometry, the balance is written as:

$$V_2O_5 + n(xMgO\text{-}E_yO_z) \rightarrow Mg_3V_2O_8 + 3[(x-1)MgO\text{-}E_yO_z] + (n-3)(xMgO\text{-}E_yO_z), \quad (6b)$$

in which n is equal to or greater than 3.

The second oxide thus has two roles, namely that of MgO "sequestrant" with respect to $SO_3$ and then as MgO "donor" with respect to $V_2O_5$.

The parameter m defined above as the "molar inhibition ratio" ($MgO/V_2O_5$) is given by: m=n x.

Each of these mixed oxides $xMgO$-$E_yO_z$ therefore constitutes a $V_2O_5$ inhibitor that can be used in a sulphating atmosphere (i.e. one rich in sulphur oxides) as it eliminates any interference by sulphur oxides in the inhibition process. The elements E exhibiting this behaviour are those of the following columns of the Periodic Table: Ina; IVa (with the exception of carbon); IIIB (especially boron and aluminium); IVB (especially titanium and zirconium); VIII (especially iron); or the lanthanide series (especially cerium). The term "mixed magnesium oxide" is a general designation that may cover, depending on the nature of E: a salt (such as a borate or a silicate); a double oxide (such as $MgAl_2O_4$ and $MgFe_2O_4$ spinels) or a solid solution (such as MgO—$ZrO_2$ or MgO—$CeO_2$).

It has been found in this list that the mixed magnesium oxides in which the second oxide $E_yO_z$ belongs to the group: $B_2O_3$, $Al_2O_3$, $Fe_2O_3$, $SiO_2$ generate, with $V_2O_5$, ash that is particularly friable, non-adherent and refractory (and therefore largely insensitive to sintering). These inhibition systems therefore make it possible to avoid post-inhibition side reactions and the ash that they form can be easily removed, both by soft mechanical abrasion (dry cleaning) and through the carry-out effect of water washing.

The mixed magnesium oxides corresponding to these four "second oxides" are:

in respect of $B_2O_3$: $3MgO$—$B_2O_3$ (x=3, y=2 and z=3);

in respect of $Al_2O_3$: MgO—$Al_2O_3$ (x=1, y=2 and z=3);
in respect of $Fe_2O_3$: MgO—$Fe_2O_3$ (x=1, y=2 and z=3);
in respect of $SiO_2$: $2MgO$—$SiO_2$ (x=2, y=1 and z=2).

Moreover, the Applicant has observed that:

the excess magnesium oxide relative to stoichiometry, which is necessary in practice so as to shift reaction (6b) to the right, is very limited; in said reaction this excess is quantified by the parameter n, which may for example be taken to be between 3 and 4.5; and the solidus temperature of the ash increases monotonically with n from a value greater than 1074° C. (n=3; reaction (6); ash rich in OV and lean in mixed oxide) up to the solidus temperature of pure $xMgO$-$E_yO_z$ (n=∞) which, for all four preferred mixed oxides, is very high; in other words, one does not form any eutectic between the three products of reaction (6b) and the more mixed oxide is added, the higher the initial melting point of the ash. This opens the way to using higher firing temperatures than in the case of conventional MgO inhibition.

In particular, the Applicant has established that using the mixed magnesium boron oxide $Mg_3B_2O_6$ enables the advantages described above to be maximized.

Boric oxide $B_2O_3$ reacts rapidly and quantitatively when hot with MgO, to form, depending on the (Mg/B) atomic ratio, magnesium tetraborate $MgB_4O_7$ ("TB"), magnesium pyroborate $Mg_2B_2O_5$ ("PB") or magnesium orthoborate $Mg_3B_2O_6$ ("OB"). These salts may also be written as MgO-$2B_2O_3$, $2MgO$—$B_2O_3$ and $3MgO$—$B_2O_3$ respectively, and they result from the following reactions:

$$MgO + 2B_2O_3 \rightarrow MgB_4O_7: \text{magnesium tetraborate} \quad (7)$$

$$3MgO + B_2O_3 \rightarrow Mg_3B_2O_6: \text{magnesium orthoborate} \quad (8)$$

$$2MgO + B_2O_3 \rightarrow Mg_2B_2O_5: \text{magnesium pyroborate.} \quad (9)$$

$B_2O_3$ is also capable of reacting with magnesium sulphate $MgSO_4$ with evolution of $SO_3$:

$$MgSO_4 + 2B_2O_3 \rightarrow MgB_4O_7 + SO_3 \quad (7b)$$

$$3MgSO_4 + B_2O_3 \rightarrow Mg_3B_2O_6 + 3SO_3 \quad (8b)$$

$$2MgSO_4 + B_2O_3 \rightarrow Mg_2B_2O_5 + 2SO_3. \quad (9b)$$

Vanadium pentoxide in turn reacts rapidly and quantitatively with the magnesium borates to give magnesium vanadates. In the case of magnesium orthoborate, $V_2O_5$ is thus converted to magnesium orthovanadate:

$$3Mg_3B_2O_6 + V_2O_5 \rightarrow Mg_3V_2O_8 + 3Mg_2B_2O_5. \quad (10)$$

Magnesium orthoborate is therefore a vanadium inhibitor according to this reaction, which corresponds to the general reaction (6) in which the formula $MgO$-$E_yO_z$ is identified with $3MgO$—$B_2O_3$. The rapidity of all these reactions enables the composition of the ash in the combustion gases to be rapidly stabilized.

The use of $B_2O_3$ also has three advantages.

The first advantage in using $B_2O_3$ as second oxide lies in the remarkable ash anti-deposition properties developed at high temperature by magnesium pyroborate and magnesium orthoborate, properties that have been discovered by the Applicant. These properties ensure particularly low ash deposition rates on hot components. Tests carried out on a burner rig over durations of 250 to 500 hours have shown for example deposition rate on average 8 times lower in the case of inhibition with boron than inhibition without boron (i.e. in inhibition by MgO alone). The existence of these exceptional anti-deposition properties is surprising since, although $Mg_2B_2O_5$ and $Mg_3B_2O_6$ are well known for their cold lubricating performance and are used in this regard as anti-wear additives in certain oils for metal gears, however, on the one hand, this behaviour of magnesium borates assumes the existence of high mechanical loadings and, on the other hand, the mechanism involved is the formation of a metal boride film with a low friction coefficient on the surface of the metal walls in mutual contact: the formation of such a boride by boron (III) reduction can take place only in the absence of air, within the lubricant, which, because of its hydrocarbon nature, actually has reducing properties. These conditions, namely low temperature and non-aerated medium, are therefore very remote from the very hot and highly oxidizing conditions prevailing within the combustion gases of a thermal installation.

One corollary of these anti-deposition properties is that it is unnecessary for the mixed oxide $3MgO\text{—}B_2O_3$ stoichiometry to be precisely reproduced, i.e. unnecessary to take the ($MgO/B_2O_3$) ratio equal to 3, rather it is possible to take values of this ratio that are greater than 3, i.e. to employ ($3MgO\text{—}B_2O_3+MgO$) mixtures, provided that the molar percentage of magnesium borates (orthoborate and pyroborate) in the ash formed is at least equal to 33%. This is because, under such conditions, the excess magnesium not combined with boron, which is in the form of an ($MgO+MgSO_4$) mixture in the combustion gases, cannot give rise to undesirable post-inhibition reactions on the hot components since the ash deposition is simply too low.

The second considerable advantage of magnesium-boron inhibitors, most particularly compared with MgO, lies in the fact that their performance is maintained in the presence of an appreciable amount of sodium. Specifically, when sodium is present in the fuel (or in the combustion air) and, after combustion, becomes incorporated into the ash in the form of $Na_2SO_4$, it reacts with $B_2O_3$, even in the presence of magnesium, to form sodium borate $Na_4B_2O_5$, which is not corrosive unlike the double sulphates and vanadates formed in MgO inhibition. This reaction may be written as:

$$2Na_2SO_4+3Mg_2B_2O_5 \rightarrow Na_4B_2O_5+2Mg_3B_2O_6+2SO_3. \quad (10b)$$

Thus, it has been found that protection by the magnesium-boron inhibitor remains effective for an ($Na_2SO_4/V_2O_5$) molar ratio ranging up to 0.5 (i.e. an (Na/V) atomic ratio also ranging up to 0.5) and that the ash formed remains friable and non-adherent, despite slight hardening. Moreover, the higher the magnesium borate content in the ash, the less this hardening effect is perceptible. This capability of neutralizing sodium and of eliminating its deleterious effects is a considerable advantage of magnesium-boron inhibitors, which opens the way to eliminating the operation of fuel desalination.

Finally, the third advantage lies in the fact that it has been found that magnesium pyroborate $Mg_2B_2O_5$, the by-product of inhibition reaction (10), which is itself rich in magnesium, reacts in turn with $V_2O_5$ with formation of magnesium pyrovanadate:

$$4Mg_2B_2O_5+3V_2O_5 \rightarrow 3Mg_2V_2O_7+2MgB_4O_7. \quad (11)$$

One magnesium pyroborate molecule is thus capable of converting 0.75 mol of $V_2O_5$ into magnesium pyroborate.

The ash formed ($Mg_3V_2O_7$ and $MgB_4O_7$) is not corrosive at high temperature and, although the melting point of magnesium tetraborate is not very high (995° C.), it lies above the wall temperature of the hot components. Consequently, this reaction between magnesium pyroborate and $V_2O_5$ prevents any accidental underdosing with the magnesium-boron inhibitor resulting in high-temperature vanadium corrosion, this constituting a major advantage from the inhibition safety standpoint. This "inhibition reserve" is considerable since, taking reaction (11) into account, each magnesium atom makes it possible, thanks to this "top-up inhibitor" role played by magnesium pyroborate, to neutralize not 0.11 mol of $V_2O_5$ (according to reaction (10)) but 0.36 mol of $V_2O_5$ according to the overall balance:

$$12Mg_3B_2O_6+13V_2O_5 \rightarrow 4Mg_3V_2O_8+9Mg_2V_2O_7+6MgB_4O_7. \quad (12)$$

Unlike $MgSO_4$, magnesium orthoborate and magnesium pyroborate are thermally very stable and also have high melting points (1312° C. and 1330° C. respectively), making their use particularly advantageous for employing very high firing temperatures.

For the purpose of determining the scope of magnesium-boron inhibitors, the general chemical balance governing $V_2O_5$ inhibition carried out in the presence of MgO and $B_2O_3$ must be analysed. Starting from one mole of $V_2O_5$, the most general reaction is written as:

$$V_2O_5+mMgO+bB_2O_3 \rightarrow aMg_3V_2O_8+(1-\alpha)Mg_2V_2O_7+b\beta Mg_3B_2O_6+b(1-\beta)Mg_2B_2O_5 \quad (13)$$

in which:

m denotes the $MgO/V_2O_5$ molar ratio: $m=(2+\alpha)+b(2+\beta)$;

b denotes the $B_2O_3/V_2O_5$ molar ratio;

$\alpha$ is the fraction of $V_2O_5$ converted to $Mg_3V_2O_8$ and $(1-\alpha)$ the fraction converted to $Mg_2V_2O_7$ ($0 \leq \alpha \leq 1$); and $\beta$ is the fraction of $B_2O_3$ converted to $Mg_3B_2O_6$ and $(1-\beta)$ the fraction converted to $Mg_2B_2O_5$ ($0 \leq \beta \leq 1$).

Figure 1:
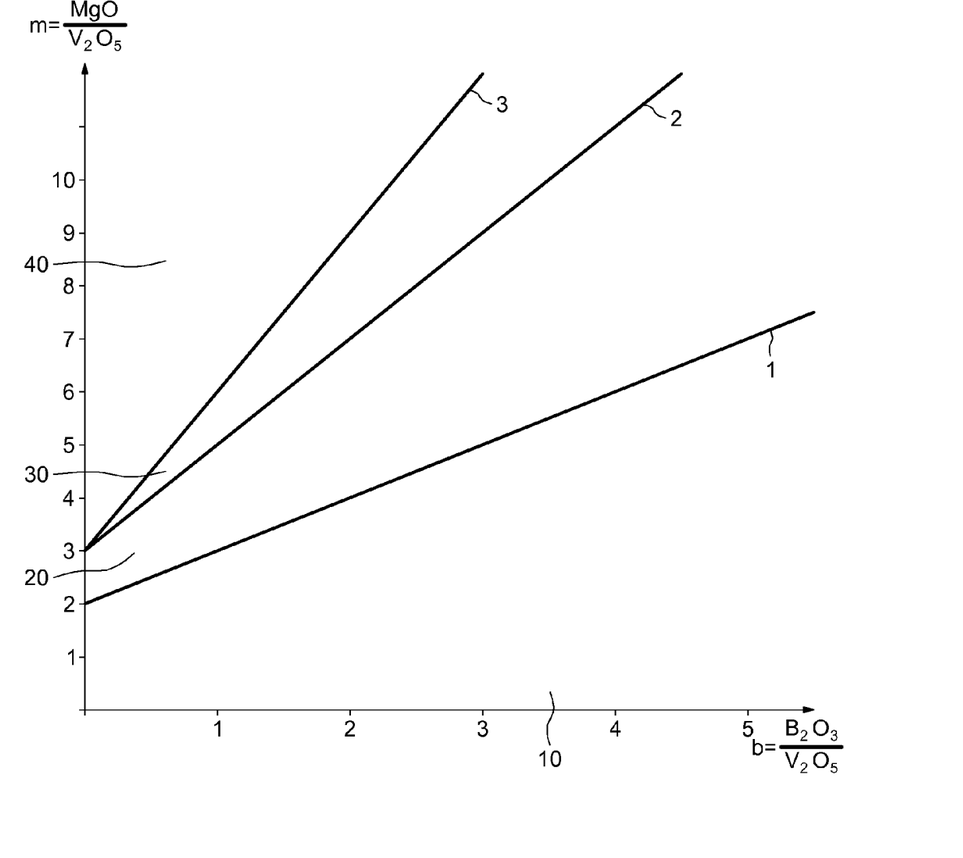
FIG. 1 depicts an m-b plot of products formed, in the absence of sodium, in accordance with the methods described herein.

FIG. 1 indicates, in the absence of sodium, the products formed as an m-b plot obtained from the Applicants' results.

FIG. 1 comprises a first line 1 representing all of the points satisfying the equation: m=2+b.

The area 10, lying beneath line 1 of equation m=2+b, corresponds to unfavourable operating conditions in which the ash is corrosive and highly fusible as a result of a considerable lack of magnesium. What forms in said area 10, depending on m and b, is magnesium tetraborate and magnesium metavanadate. In addition, for m less than (1+0.5 b), even free $V_2O_5$ and/or free $B_2O_3$ may remain.

FIG. 1 comprises a second line 2 containing the points satisfying the equation: m=3+2b.

In the area 20 lying between line 1 and line 2, magnesium pyrovanadate (melting point: 980° C.), and magnesium pyroborate and tetraborate (melting point: 995° C.) form. This region corresponds to corrosionless operating conditions but with the formation of ash that is not liquid at the skin temperature "$T_w$" of the hot components, but which does have a certain sintering tendency.

FIG. 1 includes a third line 3 representing all of the points satisfying the equation: m=3+3b.

The area 40 lying above line 3 corresponds to corrosionless but fouling operating conditions, since there is a great excess of magnesium (not combined with boron) that can be sulphated to produce ash that therefore contains not only $Mg_3V_2O_8$ and $Mg_3B_2O_6$, but also $MgSO_4$ and MgO through the play of the post-inhibition reactions.

The area 30 lying between lines 2 and 3, and including these two lines, is advantageous as magnesium orthovanadate and a mixture of magnesium metaborate and orthoborate ($\alpha=1$ and $0 \leq \beta \leq 1$ in equation (13)) are formed therein. This region corresponds to operating conditions that ensure inhibition with the formation of ash that is refractory and deposits at a low rate.

In particular, the invention provides a method of operating a thermal installation comprising a combustion chamber fed with a fuel contaminated with both vanadium and sulphur.

The combustion chamber is also fed with boron and magnesium, in amounts such that the combustion products comprise magnesium orthovanadate and a mixed magnesium boron oxide, especially either magnesium orthoborate or magnesium pyroborate.

Preferably, the magnesium and boron molar ratios m and b satisfy the equation:

$$3+2b \leq m \leq 3+3b.$$

Line 2 corresponds to the composition $Mg_3V_2O_8$—$Mg_2B_2O_5$ of the ash (corresponding to $\alpha=1$ and $\beta=0$ in reaction (13)):

$$V_2O_5+(3+2b)MgO+bB_2O_3 \rightarrow Mg_3V_2O_8+bMg_2B_2O_5. \quad (13A)$$

The minimum quantity of MgO to be introduced in order to be able to convert $V_2O_5$ exclusively to $Mg_3V_2O_8$ is therefore: $m=3+2b$. For example, for $b=1$, one has $m=5$, which should be compared with the value of 12.6 of the ($MgO/V_2O_5$) molar ratio necessary in conventional inhibition (equation (4)).

Line 3 corresponds to the final composition $Mg_3V_2O_8$—$Mg_3B_2O_6$ of the ash (corresponding to $\alpha=1$ and $\beta=1$ in reaction (13)):

$$V_2O_5+(3+3b)MgO+bB_2O_3 \rightarrow Mg_3V_2O_8+bMg_3B_2O_6. \quad (13B)$$

The value of m may be adjusted between (3+2b) and (3+3b); for example, it may take the value $m=3+2.5\ b$ (corresponding to $\alpha=1$ and $\beta=0.5$ in reaction (13)):

$$V_2O_5+(3+2.5b)MgO+bB_2O_3 \rightarrow Mg_3V_2O_8+0.5bMg_2B_2O_5+0.5bMg_3B_2O_6. \quad (13C)$$

The most general case in area 30 corresponds to the balance:

$$V_2O_5+[3+(2+\beta)b]MgO+bB_2O_3 \rightarrow Mg_3V_2O_8+b(1-\beta)Mg_2B_2O_5+\beta b Mg_3B_2O_6 \quad (13D)$$

i.e. $m=3+(2+\beta)b$, where $\beta$ is between 0 and 1.

From (13D), the molar percentage of magnesium borates (OB+PB) in the ash is given by:

$$\%\ borates = 100[b(1-\beta)+b\beta]/[1+b(1-\beta)+b\beta] = 100b/(1+b).$$

Since the anti-deposition effect of the ash depends on the content of magnesium borates (OB and PB phases) in the reaction products, it is therefore possible to adjust this effect by varying the value of the parameter b.

Thus:
- the minimum magnesium borate content of 33% in the ash in order to ensure the anti-deposition effect, which point was mentioned above, corresponds to b equal to or greater than 0.5;
- for b=1, the ash is made up of 50% magnesium borates and 50% magnesium orthovanadate;
- for b=3, the ash is 75% magnesium borates and 25% magnesium orthovanadate.

The dosing conditions observed as being the most effective are those represented by the point corresponding to b=3 and m=9. This corresponds specifically to the situation in which the inhibitor is $Mg_3B_2O_6$ (reaction (10) or reaction (13A) with b=3). In this case, the ash contains 75 mol % of magnesium borates and 25 mol % of magnesium orthovanadate. The melting point of the ash is around 1200° C. and the amount of deposition is then reduced by about 88% compared with the use of MgO alone.

In what follows, the dosing with contents corresponding to b=3 and m=9 (employing the inhibitor $Mg_3B_2O_6$) will be taken as the reference case for boron-modified inhibition.

Two other advantageous dosings are those corresponding to the points: b=1 with m=6; and b=2 with m=8.

The molar magnesium and boron ratios m and b are thus preferably chosen to be equal to 3 and 9, or to 1 and 6, or to 2 and 8, respectively.

For the purpose of containing the cost of the inhibition and the emission of dust, the parameter b must be limited, for example to a value of 3.5. Thus, the molar boron ratio b is advantageously between 0.5 and 3.5, preferably between 1 and 3.

Finally, in the presence of a not insignificant quantity of sodium defined by the molar ratio $s=(Na_2SO_4/V_2O_5)$, it is possible to reduce the ratio $m=MgO/V_2O_5$. This is because capturing $Na_2SO_4$ in the form of $Na_4B_2O_5$ consumes boron (according to reaction 10b), which therefore cannot form the mixed magnesium boron oxide with MgO. In particular, in the case in which $\beta=0$, which corresponds to the minimum values of the ratio m (points close to line 2 of equation $m=3+2b$), then:

$$V_2O_5+(3+2b-s)MgO+bB_2O_3+sNa_2SO_4 \rightarrow Mg_3V_2O_8+(b-s/2)Mg_2B_2O_5+s/2Na_4B_2O_5+sSO_3 \quad (13E)$$

i.e.: $m=3+2b-s$ (instead of $m=3+2b$).

To reduce the ash hardening caused by the presence of sodium, the value of b may be increased, thereby enabling the percentage of magnesium borates in the ash to be increased.

Thus, the invention proposes, according to a first aspect, a method of operating a thermal installation comprising a combustion chamber fed with a fuel contaminated with vanadium, with sulphur and possibly with sodium. In particular, the combustion chamber is also fed with boron and with magnesium, in quantities such that the sodium molar ratio $s=Na_2SO_4/V_2O_5$, the magnesium molar ratio $m=MgO/V_2O_5$ and the boron molar ratio $b=B_2O_3/V_2O_5$ satisfy the equation $m \geq 3+2b-s$, so that the combustion products comprise magnesium orthovanadate, mixed magnesium boron oxide and possibly sodium borate.

Preferably, the magnesium, boron and sodium molar ratios m, b and s satisfy the equation $3+2b-s \leq m \leq 3+3b-s$.

Preferably, the magnesium, boron and sodium molar ratios m, b and s satisfy the equation $m=3+2.5\ b-s$.

In particular, at least some of the boron and magnesium feeding the combustion chamber may be in the form of mixed magnesium boron oxide.

According to one mode of implementation, a mixed magnesium aluminium oxide is also formed upstream of or in the combustion chamber. The inhibition reaction (14) produced by magnesium aluminate $MgAl_2O_4$ may be written as:

$$V_2O_5+n MgAl_2O_4 \rightarrow Mg_3V_2O_8+3Al_2O_3+(n-3)MgAl_2O_4 \quad (14)$$

and under the stoichiometric conditions:

$$3MgAl_2O_4+V_2O_5 \rightarrow Mg_3V_2O_8+3Al_2O_3. \quad (14b)$$

The alumina $Al_2O_3$ and the spinel $MgAl_2O_4$ have melting points of 2045° C. and 2020° C. respectively. Another advantage of using, as inhibitor, $MgAl_2O_4$ formed in situ or upstream of flames lies in the reduction in the amount of deposition thanks to the slight erosion effect induced by the nascent $Al_2O_3$ particles and to the property of alumina of decomposing, at high temperature, a number of metal sulphates that contribute to the fouling, or even corrosion, of the hot components.

According to one mode of implementation, a mixed magnesium iron oxide is also formed upstream of or in the combustion chamber. The inhibition region (15) produced by the mixed oxide $MgFe_2O_4$ is written as:

$$V_2O_5+n MgFe_2O_4 \rightarrow Mg_3V_2O_8+3Fe_2O_3+(n-3)MgFe_2O_4 \quad (15)$$

and under the stoichiometric conditions:

$$V_2O_5 + 3MgFe_2O_4 \rightarrow Mg_3V_2O_8 + 3Fe_2O_3. \quad (15b)$$

Haematite (Fe$_2$O$_3$) and the spinel MgFe$_2$O$_4$ have melting points of 1596° C. and 1722° C. respectively. Another advantage of the use of the spinel MgFe$_2$O$_4$ as inhibitor lies in the reduction of smoke emission, since iron (III) acts within the flames as catalyst for oxidizing the carbon aggregates, i.e. the soot, the minimum quantity of iron necessary to obtain such an effect being a few tens of ppm.

According to one mode of implementation, a mixed magnesium silicon oxide is also formed upstream of or in the combustion chamber. The inhibition reaction (16a) produced by the mixed oxide Mg$_2$SiO$_4$ may be written as:

$$V_2O_5 + nMg_2SiO_4 \rightarrow Mg_3V_2O_8 + 3MgSiO_3 + (n-3)Mg_2SiO_4 \quad (16)$$

and under the stoichiometric conditions:

$$V_2O_5 + 3Mg_2SiO_4 \rightarrow Mg_3V_2O_8 + 3MgSiO_3. \quad (16b)$$

The magnesium metasilicate (MgSiO$_3$) and the magnesium orthosilicate (Mg$_2$SiO$_4$) having melting points of 1557° C. and 1888° C. respectively. The use of magnesium orthosilicate Mg$_2$SiO$_4$ as inhibitor also makes it possible to raise the melting point of the refractory ash and to greatly retard their sintering, because of the extremely slow rate of crystallization of MgSiO$_3$. Thus, the incorporation of magnesium orthosilicate in the inhibitor allows the deposits to be removed more easily and gives the possibility of extending the operating duration of the machine before a cleaning operation has to be carried out.

The inhibition reactions of the various mixed oxides presented above are therefore the reactions (10), (14), (15) and (16).

These reactions are to be compared with reaction (4) of MgO with V$_2$O$_5$ during which MgSO$_4$ (which decomposes above 900° C.) is formed.

It may be advantageous to combine various mixed magnesium oxides with magnesium orthoborate taken as predominant inhibitor, in order to create formulations of the "3MgO—B$_2$O$_3$/xMgO-E$_y$O$_z$/x'MgO-E'$_y$O$_z$/ . . . " type for the purpose of combining all the abovementioned advantages. Thus, several other operational functions associated with the respective physico-chemical properties of the second oxides may be added to the anti-deposition effect of B$_2$O$_3$. For this reason, these mixtures of mixed magnesium oxides may be termed "multifunctional" inhibitors.

With regard to the preparation of the mixed magnesium oxides and of their mixtures, and independently of the place where they are synthesized (in the flames or upstream thereof), this will start from some defined chemical derivatives of magnesium and of the second element. Thus, the mixed magnesium oxide may be formed in the combustion chamber, by reaction between two reactants introduced upstream of the combustion chamber, or from at least one precursor introduced upstream of the combustion chamber. These reactants may be chosen from those which, by decomposition, form the oxides MgO and E$_y$O$_z$ respectively, with the exclusion of other corrosive products. The following compounds may therefore be involved:

in the case of magnesium: the oxide, hydroxide, nitrate or carbonate or an alkoxide, a sulphonate, a carboxylate, etc;

in the case of the element E: the oxide, hydroxide or acid (depending on the chemical nature of E), the nitrate or carbonate, an alkoxide, a sulphonate, a carboxylate, etc.

If the second oxide is SiO$_2$ it is possible moreover to start either from a tetraalkyl orthosilicate of formula Si(OR)$_4$ and in particular TEOS (tetraethylorthosilicate) in which R is the ethyl group, or a silicone or poly(dialkyl)siloxane oil, which is characterized by a concatenation of siloxane (—Si—O—Si—) groups in which each tetravalent silicon atom is also linked to alkyl groups.

Depending on their properties (physical state and solubility), these base chemical reactants may be stored either in a form dissolved in an aqueous or organic solvent or in an emulsified form or as a stabilized suspension (as indicated below) in such a solvent, and may be introduced into the installation either in the combustion chambers or into the "fuel circuit", which is the circuit through which the fuel is injected into the combustion chambers.

With regard to the inhibitors based on MgO and B$_2$O$_3$, the starting point may be a magnesium derivative of the "overbased sulphonate" or "overbased carboxylate" type. In what follows, the specific case of an overbased carboxylate will be considered. The expression "overbased carboxylate" (i.e. a carboxylate overenriched with metal) is used in the chemistry of lubricating oils and denotes a formulation in which a carboxylic acid is combined with a superstoichiometric quantity of metal (magnesium in the present case). A conventional method of preparing such a metal-overenriched carboxylate is for example the following series of steps: (i) a carboxylic acid is dissolved in an oil solvent of low volatility; (ii) a substantial excess of a compound of the metal is suspended, with stirring, in this same medium, said compound being in general the oxide, hydroxide, carbonate or bicarbonate; (iii) a catalyst is added, this being, for example, an alcohol (favouring the transport of the non-oleophilic metallic species); (iv) the whole stirred assembly is heated to a temperature above 50° C. but below 200° C.; and (v) the neutralization of the excess metal is completed, at this temperature, by bubbling in carbon dioxide. The magnesium-overenriched carboxylate (or sulphonate) thus obtained will then be borated by introducing boric acid in suitable proportions and by stirring for several hours between 50 and 200° C. Alternatively, a liposoluble boron compound, such as an alkyl borate of generic formula (Alk)$_3$B, for example ethyl borate (C$_2$H$_5$)$_3$B, may be added to the magnesium-overenriched carboxylate or (sulphonate) thus obtained.

With regard to Al$_2$O$_3$, an aluminium carboxylate or else a dispersion, in an organic fraction, of anhydrous or hydrated alumina AlO(OH) microparticles or nanoparticles may for example be used.

Finally, with regard to Fe$_2$O$_3$, it is possible to obtain carboxylates, especially tallates (fatty-acid iron salts) or to produce stable suspensions of Fe$_2$O$_3$ microparticles or nanoparticles in solvents containing a hydrocarbon fraction.

Two methods of preparation are possible starting from these base chemical reactants:

synthesis of the mixed oxide carried out in situ, i.e. directly in the combustion chamber of the combustion installation, by reaction of at least two reactants introduced upstream of said combustion chamber. In this case, the abovementioned chemical reactants are stored upstream of the combustion chamber of the combustion installation and injected, in suitable proportions and quantities, either at a point in the fuel circuit where they will be intimately mixed with the fuel using a static or dynamic mixer, or directly into the combustion chamber. The concept of "suitable proportions" refers to the ratios of magnesium to the second oxides (parameter x), whereas the concept of "suitable quantities" refers to the Mg/V dosing ratio (parameter m);

synthesis of mixed oxide or of precursors upstream of the combustion chamber of the installation. Starting from the abovementioned chemical reactants, the mixed oxide or mixed oxide mixture, or a precursor of this mixed oxide or precursors of this mixed oxide mixture, is or are synthesized and stored upstream of the combustion installation. The term "precursors" refers to a combination (or to a number of combinations) that contains magnesium and the "second element", which is not necessarily a defined chemical compound of magnesium and the second element and which produces the desired mixed magnesium oxide in the flames. Such precursors are for example sol-gels or other nanoscale structures. The mixed oxide or its precursor, prepared in this way and stored, is injected in a suitable quantity either directly into the combustion chamber or at a point in the fuel circuit where it is intimately mixed with the fuel using a static or dynamic mixer.

To obtain optimum inhibition efficiency, the mixed oxide, and in particular the mixed magnesium oxide, may be in nanoscale form. It may especially be advantageous to synthesize mixed oxides or precursors in the form of very finely divided particles or, preferably, in the form of nanostructured substances, according to one of the following methods:

mechanical synthesis or mechanical activation carried out either (i) directly within the aqueous or hydrocarbon solvent in which the nanosubstances formed will be conveyed to the combustion installation or (ii) in air or in a controlled atmosphere before the nanosubstances formed in said aqueous or hydrocarbon solvent are subsequently put into suspension;

"soft chemistry" methods such as the sol-gel method, including the Pecchini variant (described in the U.S. Pat. No. 3,330,679) or the Cipollini variant (described in the U.S. Pat. No. 4,654,075), which methods are based on molten nitrates, or the "dry emulsion" method (described in the U.S. Pat. No. 4,908,338) which will be interrupted before the step of distilling the hydrocarbon cut, etc.

Such nanostructured compounds are particularly reactive with respect to vanadium in the flames and lend themselves to extremely fine and very stable aqueous or hydrocarbon dispersions. To provide the suspension and stabilization functions, dispersants may be added, such as "comb polymers", i.e. those with a structure comprising a hydropohilic "back bone" and lipophilic "teeth", or vice versa, for example polyhydroxyethyl methacrylate (PHEMA).

According to one aspect, the method described above is used to inhibit the corrosion of the thermal installation by vanadium oxide, possibly in the presence of sodium.

According to one aspect, the metallic, ceramic or composite materials of a combustion installation, for example a gas turbine burning fuel contaminated with vanadium, which may or may not be associated with sodium in an ($Na_2SO_4$/$V_2O_5$) molar ratio s, are protected from vanadium corrosion by introducing into or forming in the combustion chamber of said installation, an inhibitor formed by a mixture of magnesium borates and possibly of magnesium oxide, such that:

(i) the ($B_2O_3$/$V_2O_5$) molar ratio is equal to b;
(ii) the ($MgO$/$V_2O_5$) molar ratio m is between (3+2b−s) and (3+3b); and
(iii) b is between 0.5 and 3.5.

Preferably, the (b,m) pair is equal to (3,9) or (1,6) or satisfies the equation m=3+2.5b. More preferably, the (b,m) pair is equal to (3,9).

These inhibitors are termed "bifunctional" inhibitors since, besides their anti-corrosion function, they improve the operating conditions of the machine and in particular its efficiency, its power and its maintenance thanks to favourable modification of the ash.

According to another mode of the invention, an inhibitor consisting of one or more mixed magnesium oxides, the second oxides $E_yO_z$ of which are, on the one hand and mainly, $B_2O_3$ and, on the other hand, one or more other oxides preferably chosen from the list: $Al_2O_3$, $Fe_2O_3$ and $SiO_2$, with $MgO/E_yO_z$ molar ratios x equal to: 3, 1, 1 and 2 respectively, is introduced into or formed in the combustion chamber of said installation.

These multifunctional formulations are characterized by the association of magnesium orthoborate with one or more of the following three mixed oxides: (i) the spinel $MgAl_2O_4$ for the purpose of minimizing the amount of ash deposited thanks to the effect of erosion caused by the nascent $Al_2O_3$ particles and of reducing the fouling by certain metal sulphates (such as $CuSO_4$, $ZnSO_4$) that are present as impurities in the combustion gases; (ii) the spinel $MgFe_2O_4$ with a view to reducing smoke emission thanks to the catalytic effect of iron (III) on soot combustions; and (iii) magnesium orthosilicate with a view to delaying their sintering and therefore to possibly extending the operating of the machine before a clean-up operation has to be performed thereon.

The primary method of cleaning up the installation is dry cleaning by injecting a mild abrasive, as described above, with water washing being a secondary way of cleaning up the installation.

To better illustrate the invention, several embodiments are described below. The concentrations in ppm (parts per million) of the metals are to be taken as mass concentrations.

1$^{st}$ Exemplary Embodiment of the Invention

An E-class turbine intended for generating electricity has a thermal power of 360 MW (i.e. an electrical power of around 120 MW) and a firing temperature set at 1090° C. It burns, continuously, at full power, a heavy fuel oil with a vanadium content of around 40 to 50 ppm. Vanadium corrosion is inhibited at the start by injecting 120 to 150 ppm of magnesium (Mg/V mass ratio=3) which is added to the fuel in magnesium carboxylate form. The raw fuel initially contains 50 ppm of alkali metals and is desalinated by water washing so as to achieve a (sodium+potassium) level of 0.7 ppm at the inlet of the GT. The GT is equipped with a dry cleaning device (projectiles used: walnut shell fragments) and with a device for washing the turbine (with demineralized water at 80-90° C.). The operator carries out dry cleaning operations twice a day. However, these dry cleaning operations enable only a small fraction of the lost power to be recovered, which fraction goes from about 30% at the start of the cycle to about 10% at the end of the cycle, owing to the compaction and sintering of the MgO/$MgSO_4$ deposits. The "net" rate of power loss of the GT by the turbine fouling effect is on average about 10% over 7 days (168 hours) of operation, i.e. 0.06% per hour. The adjective "net" means that this rate of power loss takes into account the partial power restorations provided by the dry cleaning operations. This determines that the operator has to carry out a turbine washing operation precisely every 7 days, which is therefore the duration of a "production cycle" (period between two washing operations). A water washing operation lasts about 20 hours between stopping the GT and restarting it. The associated loss of availability of the GT is therefore around: 20/(168+20)=11%.

These not very favourable operation/maintenance conditions prompt the operator to replace the magnesium-carboxylate-based inhibitor with an MgO—$B_2O_3$ inhibitor, which is produced in situ in the flames by injecting into the fuel a hydrocarbon solution of a borated overbased magnesium carboxylate, in which solution the $B_2O_3/V_2O_5$ molar ratio b and $MgO/V_2O_5$ molar ratio m are equal to 1 and 6 respectively. The stoichiometric inhibition reaction is the reaction (13B) in which b=1 and m=6:

$$V_2O_5+6MgO+B_2O_3 \rightarrow Mg_3V_2O_8+Mg_3B_2O_6. \tag{17}$$

The practical ($MgO/V_2O_5$) molar inhibition ratio is chosen to be equal to 6 (without margin relative to the theoretical inhibition ratio of reaction (17)).

The operator maintains the twice-daily frequency of the dry cleaning operations which make it possible this time to recover, each time, on average 80% of the power lost between two consecutive cleaning operations. The average rate of power loss of the GT is reduced by a factor of 5. The operator then carries out a washing operation every 500 hours and consequently achieves an increase in availability of his machine of (20/188-20/520), i.e. ~7%, relative to the prior situation, while considerably increasing its efficiency and its electricity generation owing to the loss of power being 5 times less rapid over a production cycle.

2<sup>nd</sup> Exemplary Embodiment of the Invention

The GT is of the same model as that of the first embodiment and the initial inhibitor is also a magnesium carboxylate. The GT has a firing temperature also set to 1090° C. and is equipped with devices for dry cleaning and water washing the turbine that are identical to those of example 1. The operator also carries out dry cleaning operations twice daily. However, the heavy fuel contains only 10 ppm of vanadium. The "net" rate of power loss of the GT is on average around 10% over 20 days (480 hours) of operation, i.e. 0.02%/hour. The operator carries out a turbine wash operation every 20 days, which is therefore the duration of a "production cycle". The operator desires to increase the firing temperature of his GT by 30° C. for the purpose of increasing power and efficiency. For this purpose, he replaces the magnesium-carboxylate-based inhibitor with a magnesium-orthoborate-based inhibitor. This is also prepared by introducing a hydrocarbon solution of a borated overbased magnesium carboxylate into the fuel, in which solution the $B_2O_3/V_2O_5$ molar ratio b and the $MgO/V_2O_5$ molar ratio m are chosen this time to be higher and equal to 3 and 9 respectively, for the purpose of increasing the magnesium borate content in the ash and of thereby reducing ash accumulation. The stoichiometric inhibition reaction is reaction (10). The inhibition molar ratio m is chosen to be equal to 9 (without margin relative to the theoretical inhibition ratio of reaction (10)). The operator maintains the twice-daily frequency of the dry cleaning operations. It has been found that with the new firing temperature $T_f$ of 1120° C. and inhibition using magnesium orthoborate, the "net" rate of power loss is substantially unchanged (0.02%/hour). The operator also carries out a washing operation every 500 hours. The efficiency and electricity generation of his machine are considerably increased, while protecting its integrity and without degrading its availability.

3<sup>rd</sup> Exemplary Embodiment of the Invention

A GT of 120 MW of thermal power (40 MW electrical power) burns a heavy fuel contaminated with 50 ppm of vanadium. However, the heavy fuel delivered is very viscous and also contaminated with 75 ppm of sodium, which is not completely removed by the fuel treatment unit upstream of the GT, the sodium content at the outlet of the latter and at the inlet of the GT being 9.1 ppm, i.e. an ($Na_2SO_4/V_2O_5$) molar ratio equal to 0.40. To combat the additional corrosive effect of alkali metals, the operator decides to use a magnesium-boron inhibitor, adjusting the $MgO/B_2O_3$ ratio in accordance with reaction (13E) in which the ($B_2O_3/V_2O_5$) ratio b is equal to 3. Reaction (13E) may be written in this case as:

$$V_2O_5+8.6MgO+3B_2O_3+0.40Na_2SO_4 \rightarrow Mg_3V_2O_8+ \\ 2.8Mg_2B_2O_5+0.2Na_4B_2O_5+0.4SO_3. \tag{13E}$$

To ensure correct inhibition using this formulation, a sufficient amount must therefore be injected in order to ensure an $MgO/V_2O_5$ molar inhibition ratio equal to or greater than 8.6 and there must be an $MgO/B_2O_3$ molar ratio of 8.6/3=2.87 in the inhibited fuel. The percentage of magnesium-boron compounds in the ash is equal to 2.8/(1+2.8+0.2)=70%.

The inhibitor may be prepared from $Mg_3B_2O_8$ nanoparticles formed by the Cippolini method (U.S. Pat. No. 4,654, 075) that are suspended in a hydrocarbon of the Kerdane type. The operator can thus protect his machine from the corrosive effect of $Na_2SO_4$ and $V_2O_5$, while considerably increasing the efficiency and electricity generation of said machine.

4<sup>th</sup> Exemplary Embodiment of the Invention

A GT of 120 MW of thermal power (40 MW electrical power) burns a heavy fuel contaminated with 51 ppm of vanadium, but this fuel is also highly aromatic as it contains quite a high HCO (high cycle oil) content used as stabilizer for the asphaltenes contained in this fuel.

Following substantial emission of black smoke, the operator decides to replace his magnesium-based inhibitor with a 75% $Mg_3B_2O_6$/25% $MgFe_2O_4$ mixed inhibitor.

The stoichiometric inhibition reaction is expressed as:

$$2.25Mg_3B_2O_6+0.75MgFe_2O_4+V_2O_5 \rightarrow Mg_3V_2O_8+ \\ 2.25Mg_2B_2O_5+0.75Fe_2O_3. \tag{18}$$

The theoretical ($MgO/V_2O_5$) inhibition ratio is 7.5.

The iron content in the inhibited fuel may be calculated as follows:

Per kilogram of fuel, there are 51 mg of vanadium, representing 0.001 atoms of this metal, which is converted in the combustion to 0.0005 mol of $V_2O_5$ Inhibition reaction (18) forms 0.0005×0.75×2=0.00075 atoms of iron in $Fe_2O_3$ form. Therefore in the fuel there is 0.00075×58=0.035 g, i.e. 35 mg, of the element iron per kilogram of fuel, a sufficient quantity to reduce the opacity of the smoke to an acceptable level.

This multifunctional inhibitor is produced by the "dry emulsion" process (U.S. Pat. No. 4,908,338) in which particles containing for example, in molar proportions, 55.6% $Mg(NO_3)_2$, 33.3% $H_3BO_3$ and 11.1% $Fe(NO_3)_3$ are put into stabilized suspension in a hydrocarbon phase in order to form precursors of the two mixed oxides and are introduced into the flames by injection into the fuel circuit.

INCORPORATION BY REFERENCE

The contents of all references (including literature references, issued patents, published patent applications, and co-pending patent applications) cited throughout this application are hereby expressly incorporated herein in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

What is claimed is:

1. A method of operating a thermal installation comprising a combustion chamber fed with a fuel contaminated with vanadium, with sulphur and possibly with sodium, the method comprising feeding the combustion chamber with boron and with magnesium so that magnesium orthoborate and/or magnesium pyroborate is/are present in the combustion chamber, wherein the sodium molar ratio $s=Na_2SO_4/V_2O_5$, the magnesium molar ratio $m=MgO/V_2O_5$ and the boron molar ratio $b=B_2O_3/V_2O_5$ satisfy the equation $m \geqq 3+2b-s$.

2. The method according to claim 1, in which the sodium, magnesium and boron molar ratios also satisfy the equation: $m \leqq 3+3b-s$.

3. The method according to claim 1, in which the boron molar ratio $b=B_2O_3/V_2O_5$ is between 0.5 and 3.5.

4. The method according to claim 1, in which the boron molar ratio $b=B_2O_3/V_2O_5$ and the magnesium molar ratio $m=MgO/V_2O_5$ are chosen to be equal to 3 and 9, or to 1 and 6, or to 2 and 8, respectively.

5. The method according to claim 1, in which the boron molar ratio $b=B_2O_3/V_2O_5$ and the magnesium molar ratio $m=MgO/V_2O_5$ satisfy the equation: $m=3+2.5b-s$.

6. The method according to claim 1, in which at least some of the boron and magnesium feeding the combustion chamber is in the form of magnesium orthoborate and/or magnesium pyroborate.

7. The method according to claim 6, in which the magnesium orthoborate and/or magnesium pyroborate is in nanoscale form.

8. The method according to claim 1, further comprising forming a mixed magnesium iron oxide and/or a mixed magnesium silicon oxide and/or a mixed magnesium aluminum oxide upstream of or in the combustion chamber.

9. The method according to claim 8, in which the mixed magnesium oxide is formed in the combustion chamber by reaction between two reactants introduced upstream of the combustion chamber.

10. The method according to claim 8, in which the mixed magnesium oxide is formed in the combustion chamber from at least one precursor introduced upstream of the combustion chamber.

11. The method according to claim 8, in which the mixed oxide is in nanoscale form.

12. A method for inhibiting corrosion of a thermal installation by vanadium oxide, wherein the thermal installation comprises a combustion chamber fed with a fuel contaminated with vanadium, with sulphur and possibly with sodium, the method comprising feeding the combustion chamber with boron and with magnesium so that magnesium orthoborate and/or magnesium pyroborate is/are present in the combustion chamber, wherein the sodium molar ratio $s=Na_2SO_4/V_2O_5$, the magnesium molar ratio $m=MgO/V_2O_5$ and the boron molar ratio $b=B_2O_3/V_2O_5$ satisfy the equation $m \geqq 3+2b-s$, thereby inhibiting corrosion of the thermal installation by vanadium oxide.

13. The method according to claim 12, in which the sodium, magnesium and boron molar ratios also satisfy the equation: $m \leqq 3+3b-s$.

14. The method according to claim 12, in which the boron molar ratio $b=B_2O_3/V_2O_5$ is between 0.5 and 3.5.

15. The method according to claim 12, in which the boron molar ratio $b=B_2O_3/V_2O_5$ and the magnesium molar ratio $m=MgO/V_2O_5$ are chosen to be equal to 3 and 9, or to 1 and 6, or to 2 and 8, respectively.

16. The method according to claim 12, in which the boron molar ratio $b=B_2O_3/V_2O_5$ and the magnesium molar ratio $m=MgO/V_2O_5$ satisfy the equation: $m=3+2.5b-s$.

17. The method according to claim 12, in which at least some of the boron and magnesium feeding the combustion chamber is in the form of magnesium orthoborate and/or magnesium pyroborate.

18. The method according to claim 17, in which the magnesium orthoborate and/or magnesium pyroborate is in nanoscale form.

19. The method according to claim 3, in which the boron molar ratio $b=B_2O_3/V_2O_5$ is between 1 and 3.

20. The method according to claim 14, in which the boron molar ratio $b=B_2O_3/V_2O_5$ is between 1 and 3.

* * * * *